(12) United States Patent
Yamazaki et al.

(10) Patent No.: US 8,037,491 B2
(45) Date of Patent: *Oct. 11, 2011

(54) DATA TRANSMITTING METHOD, DATA TRANSMITTING SYSTEM, DATA RECEIVING METHOD AND RECEIVING TERMINAL

(75) Inventors: Tomotaka Yamazaki, Tokyo (JP); Hiromitsu Baba, Tokyo (JP); Yoshiharu Takeda, Tokyo (JP); Yoshinori Uchiyama, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/803,904

(22) Filed: May 16, 2007

(65) Prior Publication Data

US 2007/0226322 A1    Sep. 27, 2007

Related U.S. Application Data

(62) Division of application No. 09/496,769, filed on Feb. 3, 2000, now Pat. No. 7,574,720.

(30) Foreign Application Priority Data

Feb. 5, 1999 (JP) .................................. P11-029182

(51) Int. Cl.
*H04N 7/173* (2011.01)
*H04L 9/00* (2006.01)
*H04N 7/167* (2006.01)
*H04L 9/32* (2006.01)

(52) U.S. Cl. ........................... 725/31; 717/178; 713/171
(58) Field of Classification Search .................. 380/277, 380/286; 725/132, 140, 152; 713/162, 173
See application file for complete search history.

(56) References Cited

U.S. PATENT DOCUMENTS

| 4,982,430 A | | 1/1991 | Frezza et al. |
| 5,003,591 A | | 3/1991 | Kauffman et al. |
| 5,260,778 A | | 11/1993 | Kauffman et al. |
| 5,303,303 A | * | 4/1994 | White ............................ 713/160 |

(Continued)

FOREIGN PATENT DOCUMENTS

JP    6-252896 A    9/1994

(Continued)

OTHER PUBLICATIONS

Masakki Fujikawa, Jiro Yoshino, "Internet is Evoked by a Satellite PART3 Data Broadcasting that IP Association Begins," Nikkei Communications, Nikkei BP, Sep. 1, 1997, No. 253, p. 108-113.

(Continued)

*Primary Examiner* — Pankaj Kumar
*Assistant Examiner* — Reuben M Brown
(74) *Attorney, Agent, or Firm* — Lerner, David, Littenberg, Krumholz & Mentlik, LLP

(57) ABSTRACT

In a method and system for transmitting and receiving data, specified data can be transmitted only to a specific receiving terminal by assigning unique terminal information to the receiving terminal. When transmitted with data, the unique terminal information identifies the specific receiving terminal as the destination of transmission from among a plurality of receiving terminals. An update program for changing the processing of the receiving terminal may be transmitted to the specific receiving terminal along with the unique terminal information. The unique terminal information and the update program are stored in a prescribed storage location in the specific receiving terminal. Thus, a one-to-one broadcasting system is achieved.

34 Claims, 5 Drawing Sheets

U.S. PATENT DOCUMENTS

| | | | |
|---|---|---|---|
| 5,682,195 A | | 10/1997 | Hendricks et al. |
| 5,689,563 A | * | 11/1997 | Brown et al. ............... 380/247 |
| 5,784,597 A | | 7/1998 | Chiu et al. |
| 5,790,753 A | | 8/1998 | Krishnamoorthy et al. |
| 5,835,725 A | * | 11/1998 | Chiang et al. ............... 709/228 |
| 5,845,077 A | * | 12/1998 | Fawcett ....................... 709/221 |
| 5,852,721 A | | 12/1998 | Dillon et al. |
| 5,862,220 A | | 1/1999 | Perlman |
| 5,894,516 A | | 4/1999 | Brandenburg |
| 6,028,937 A | * | 2/2000 | Tatebayashi et al. ......... 713/169 |
| 6,049,671 A | | 4/2000 | Slivka et al. |
| 6,058,476 A | * | 5/2000 | Matsuzaki et al. ........... 713/169 |
| 6,125,185 A | * | 9/2000 | Boesch ........................ 380/285 |
| 6,182,142 B1 | | 1/2001 | Win et al. |
| 6,208,656 B1 | * | 3/2001 | Hrastar et al. ................ 370/401 |
| 6,216,171 B1 | | 4/2001 | Isono et al. |
| 6,295,560 B1 | | 9/2001 | Kanno et al. |
| 6,330,677 B1 | * | 12/2001 | Madoukh ........................ 726/2 |
| 6,427,238 B1 | | 7/2002 | Goodman et al. |
| 6,714,931 B1 | * | 3/2004 | Papierniak et al. ............. 707/10 |
| 6,728,878 B2 | * | 4/2004 | Dillon ........................... 713/160 |
| 2003/0108048 A1 | | 6/2003 | Kwok et al. |

FOREIGN PATENT DOCUMENTS

| | | |
|---|---|---|
| JP | 7-073042 A | 3/1995 |
| JP | 8-506942 T | 7/1996 |
| JP | 9-064937 A | 3/1997 |
| JP | 9-091143 A | 4/1997 |
| JP | 9-252271 A | 9/1997 |
| JP | 9-265394 A | 10/1997 |
| JP | 9-510596 T | 10/1997 |
| JP | 10-056416 A | 2/1998 |
| JP | 10-257085 A | 9/1998 |
| JP | 10-260844 A | 9/1998 |
| JP | 11-017701 A | 1/1999 |

OTHER PUBLICATIONS

Japanese Office Action issued on Aug. 13, 2008 in connection with corresponding Japanese Application No. HEI 11-029182.

* cited by examiner

DATA TRANSMITTING METHOD, DATA TRANSMITTING SYSTEM, DATA RECEIVING METHOD AND RECEIVING TERMINAL

CROSS-REFERENCE TO RELATED APPLICATIONS

This application is a divisional of U.S. application Ser. No. 09/496,769, filed on Feb. 3, 2000, the disclosure of which is incorporated herein by reference.

BACKGROUND OF THE INVENTION

1. Field of the Invention

The present invention relates to a data transmitting method, a data transmitting system, a data receiving method and a receiving terminal, and more particularly, is suitably applied to a digital satellite broadcasting system.

2. Description of the Related Art

In the digital satellite broadcasting system, a broadcasting service using a communication satellite (CS) (hereinafter, this is referred to as CS broadcasting) provides user programs on hundreds of channels. Moreover, in recent years, in the CS broadcasting of the digital satellite broadcasting system, a data broadcasting service has been provided, so that the users can receive the data broadcast via a receiving board for data broadcasting.

As shown in FIG. 1, in a digital satellite broadcasting system 80, a broadcast wave transmitted from the antenna 81 of a broadcasting station is distributed via a communication satellite 82, received by an integrated receiver decoder (IRD) and a receiving board for data broadcasting (not shown in Fig.) via each antenna 83A to 85A. This received data is transmitted to each client personal computer (hereinafter, these are referred to as a client PC) 83 to 85 as a data broadcast signal. This is known as one-to-many broadcasting service that means there are many unspecified clients as receivers with respect to one broadcasting station as a sender.

Such a digital satellite broadcasting system 80 provides the one-to-many broadcasting service, so that data is not transmitted only to specified client PCs 83 to 85 from the broadcasting station.

On the other hand, in an information transmitting system using an open-network on Internet, when a client requests a server for transferring, for example, a homepage through a terrestrial circuit and Internet, the server reads the desired homepage from a prescribed database, and transmits this to the client through the same terrestrial circuit as that used when the request was made.

In such an information transmitting system using Internet, the amount of transmittable data is limited depending on a transmission rate of a telephone line that connects the server to the clients, and the traffic (data traffic). This is because it takes a long time to transmit a homepage including picture data, which has a large amount of information, from the server to the client.

To obviate such defects, in recent years, a new information transmitting system (hereinafter, this is referred to as satellite Internet system) called satellite Internet has been provided, in which a mass of data such as a homepage including picture data is distributed from a server to a client in a short time via a communication satellite for CS broadcasting.

In a satellite Internet system 90, as shown in FIG. 2 in which the same reference numerals are added to corresponding parts in FIG. 1, when a client PC 83 as a receiver requests an Internet provider (hereinafter, this is simply referred to as a provider) as a sender for transferring a desired homepage, through a public circuit 86, the sender transmits the video data of the specified homepage on an Internet 88 via an antenna 81 and a communication satellite 82, and the receiver receives the data with an IRD and a receiving board only for satellite Internet (not shown) via an antenna 83A to transmit this to the client PC 83.

This satellite Internet system 90 uses the terrestrial public circuit 86 as an up-circuit from the client PC 83, and uses a satellite circuit capable of transmitting a mass of data at a high speed as a down-circuit. Thereby, a mass of data such as a homepage including picture data can be transmitted to the client PC 83 in a short time.

Here, the satellite Internet system 90 utilizes a transmission control protocol/Internet protocol (TCP/IP) in the Internet. When a receiving board only for satellite Internet that is to receive data such as a homepage transmitted from the communication satellite 82 is installed in the IRD with plug-and-play, the satellite Internet system 90 recognizes the receiving board as a device for the network.

That is, each receiving board only for satellite Internet has a unique MAC address (media access control). The provider 87 as a sender can transmit data to the client PC 83 as a receiver via the receiving board only for satellite Internet with an IP address when the MAC address is added to the header of an Internet protocol (IP) packet.

Here, the IP address is a unique address which is composed of a network address and a host address in a network layer of the time when an IP packet is transmitted and received. The MAC address is a unique physical address which is used to identify a terminal connected to a local area network (LAN). That is, the IP packet is transmitted to a specified client based on both the IP address and the MAC address.

Then, it is considered that if the digital satellite broadcasting system 80 can utilize the communication system of the satellite Internet system 90 which realizes a one-to-one intercommunication, the one-to-one intercommunication can be realized also in the digital satellite broadcasting system 80.

However, since a digital satellite broadcasting system 80 provides a one-to-many broadcasting service, it is necessary to assign a unique MAC address to each receiving board for data broadcasting to transmit data from a broadcasting station only to specified client PCs 83 to 85.

In the digital satellite broadcasting system 80, however, the data broadcasting service using the CS broadcasting has already been implemented. Thus, it has been practically difficult to load later read only memories (ROMs) each storing a MAC address, in the receiving boards for data broadcasting that many users already have, because a recall of the receiving boards for data broadcasting is needed.

SUMMARY OF THE INVENTION

In view of the foregoing, an object of this invention is to provide a data transmitting method, a data transmitting system, a data receiving method and a receiving terminal which are capable of assigning unique terminal information to a receiving terminal and transmitting specified data only to a specified receiving terminal.

The foregoing object and other objects of the invention have been achieved by the provision of a data transmitting method and a data transmitting system. In the case of transmitting data from a transmission apparatus to a receiving terminal, unique terminal information to specify and identify one of plural receiving terminals as a destination of transmission and an update program to change processing of the receiving terminal are transmitted from the transmission apparatus to the receiving terminal, the unique terminal information and the update program are received by the receiving terminal and the unique terminal information and the update program are stored in a prescribed storage unit to update the processing.

Since the unique terminal information is assigned to the receiving terminal and the processing of the receiving terminal is updated by the update program, a transfer request generated based on the update program is transmitted to the transmission apparatus along with the unique terminal information. In response to the transfer request, desired data can be transmitted only to a specified receiving terminal from the transmission apparatus based on the unique terminal information. Therefore, a data transmitting method and a data transmitting system can be realized, which is capable of assigning unique terminal information to a receiving terminal and of transmitting prescribed data to only a specified receiving terminal.

Furthermore, the present invention provides a receiving terminal for receiving data transmitted from a transmission apparatus. The receiving terminal comprises a receiver operable to receive unique terminal information to specify and identify one of plural receiving terminals as a destination of the transmission and an update program to change processing of the receiving terminal sent from the receiver, and a storage unit operable to store the unique terminal information and the update program received by the above receiver.

Since the unique terminal information is assigned to the receiving terminal and the processing of the receiving terminal is updated by the update program, a transfer request generated based on the update program is transmitted to the transmission apparatus along with the unique terminal information, and desired data corresponding to the transfer request which is transmitted from the transmission apparatus based on the unique terminal information can be received by the receiving terminal. Therefore, a receiving terminal can be realized, which is capable of receiving desired data corresponding to a transfer request.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
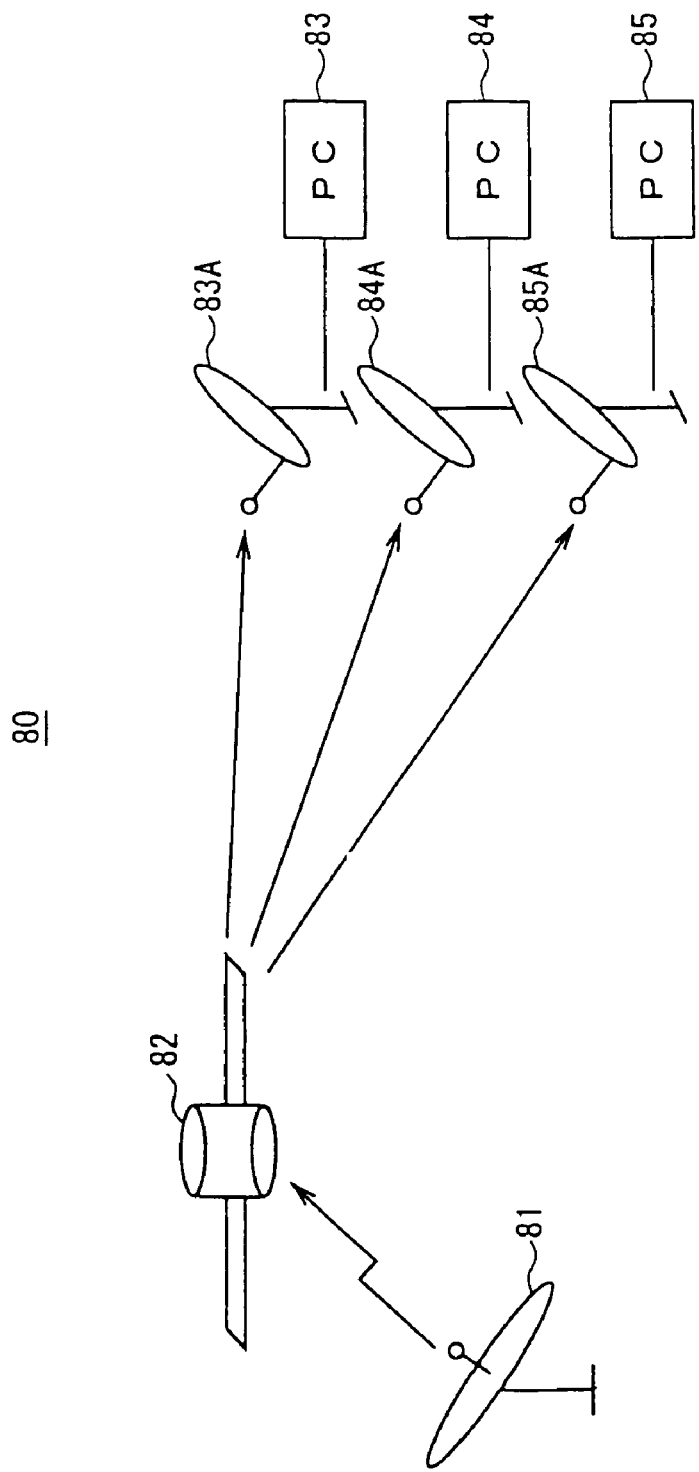
FIG. 1 is a schematic diagram showing the configuration of a digital satellite broadcasting system.
Figure 2:
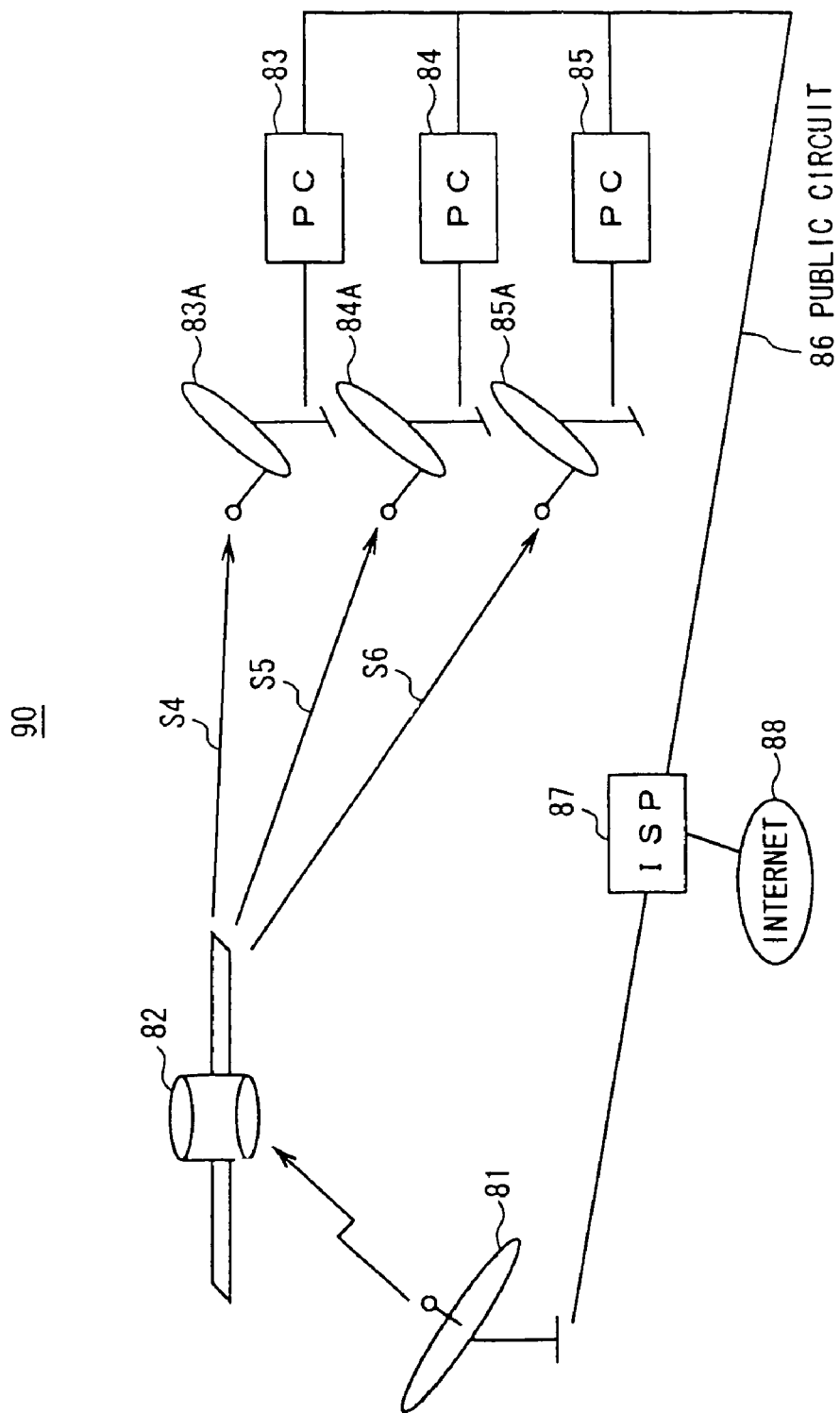
FIG. 2 is a schematic diagram showing the configuration of a satellite Internet system.
Figure 3:
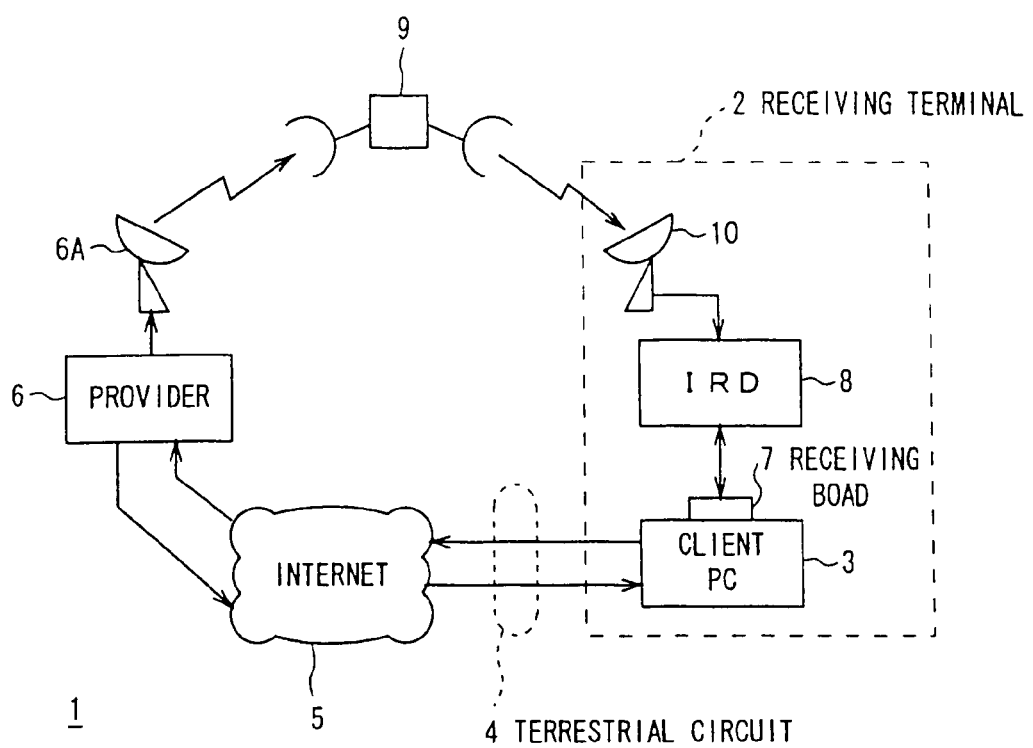
FIG. 3 is a schematic block diagram showing the configuration of an satellite Internet system of this embodiment.

Preferred embodiments of this invention will be described with reference to the accompanying drawings:

Referring to FIG. 3, 1 generally shows a satellite Internet system as a data transmitting system according to the present invention. When a user uses a normal digital satellite broadcasting service, a digital broadcast signal transmitted from a communication satellite 9 is received by an integrated receiver decoder (IRD) 8 via the antenna 10 of a receiving terminal 2.

Figure 4:
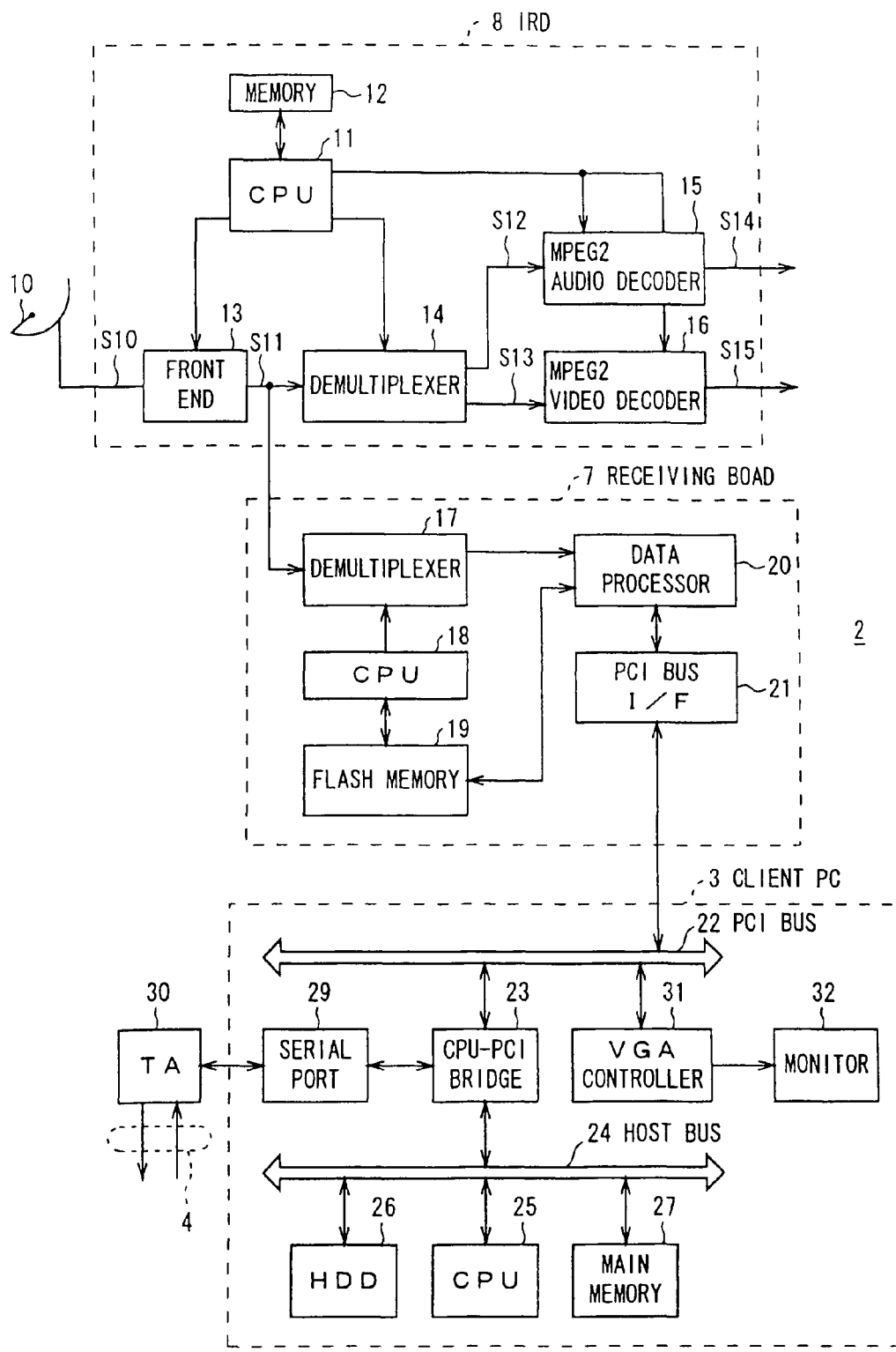
FIG. 4 is a block diagram showing the configuration of a receiving terminal.

As shown in FIG. 4, the IRD 8 controls a front end 13, a demultiplexer 14, a motion picture expert group (MPEG) 2 audio decoder 15 and an MPEG2 video decoder 16 with a central processing unit (CPU) 11 that is connected to a memory 12 being a random access memory (RAM) storing a prescribed processing program. The IRD 8 transmits a digital broadcast signal S10 received via the antenna 10 to the front end 13.

The front end 13 performs quadrature phase shift keying (QPSK) demodulation processing on the digital broadcast signal S10, and then performs data error correction processing on the demodulated signal to extract a transport stream S11, and transmits this to the demultiplexer 14.

The demultiplexer 14 separates the extracted transport stream S11 picks out the program data of a contracted channel, and transmits an audio stream S12 comprised of packets of the audio part of the above program data to the MPEG2 audio decoder 15 and at the same time, it transmits a video stream S13 comprised of the packets of the video part to the MPEG2 video decoder 16.

The MPEG2 audio decoder 15 returns the audio data before compression-coding by decoding the audio stream S12, converts this into an analog signal to generate an audio signal S14, and outputs this as a program's sound from a speaker of a monitor (not shown) in the following stage.

The MPEG2 video decoder 16 returns the video data before compression-coding by decoding the video stream S13, converts this into an analog signal to generate a video signal S15, and outputs this as a program's image to the monitor (not shown) in the following stage.

Figure 5:
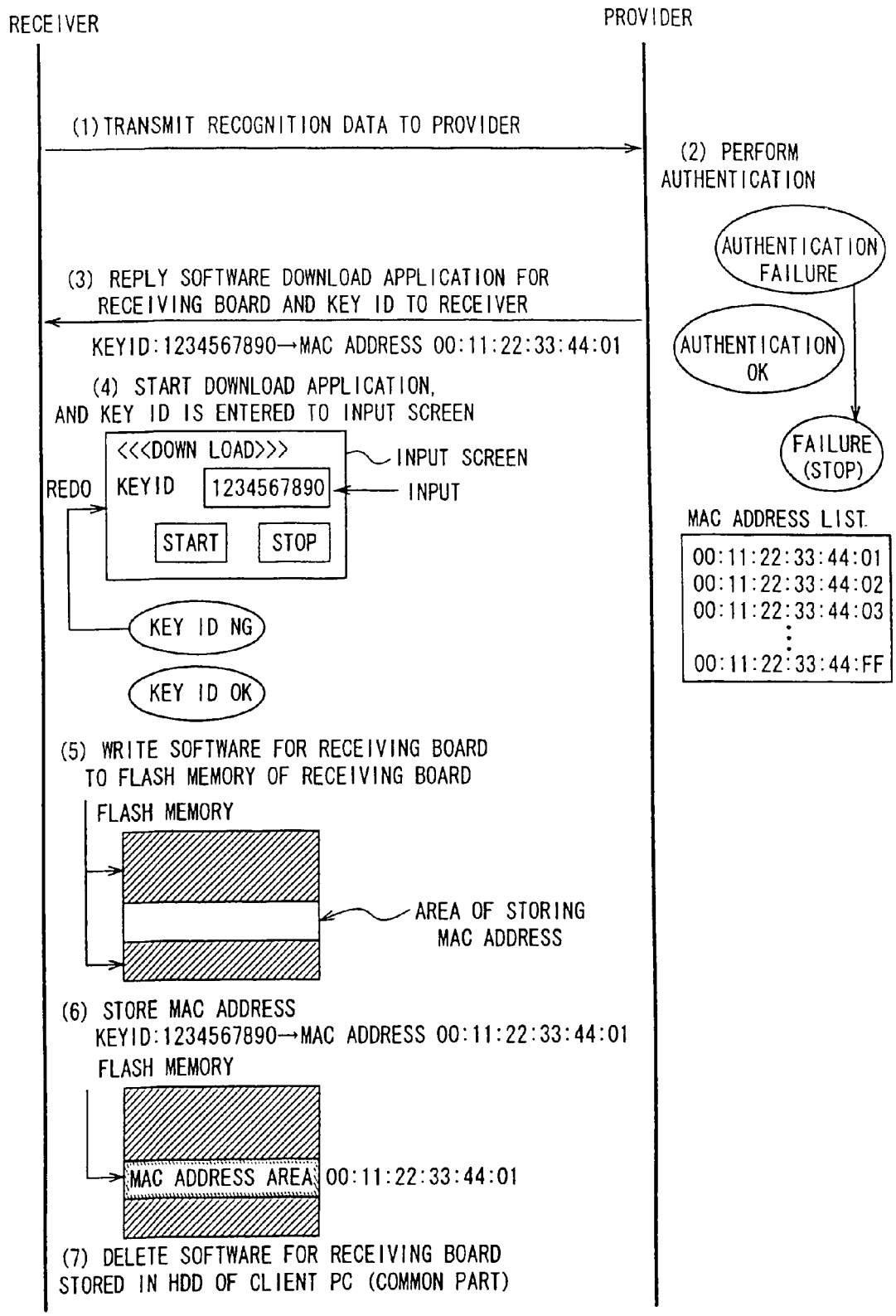
FIG. 5 is a schematic diagram showing a procedure for downloading software and a MAC address sent from a provider, to a receiving board.

Hereinafter, the processing in the satellite Internet system 1 (FIG. 3) when a user uses a satellite Internet service will be described with reference to FIGS. 4 and 5.

First, in a client personal computer (PC) 3, as a first step, a CPU 25 reads out a client's name unique to the client PC 3 or equipment information unique to a receiving board 7 from a main memory 27 through a host bus 24 as recognition data, and transmits this to a terminal adopter (TA) 30 via a peripheral component interconnect (PCU-PCI) bridge 23 and a serial port 29.

The TA 30 performs prescribed modulation processing on the identification data, and then transmits the modulated data to a provider 6 via the transmission apparatus through a terrestrial circuit 4 such as an integrated services digital network (ISDN), and an Internet 5 (1).

As a second step, the provider 6 refers to a customer management database (not shown) based on the recognition data. If the recognition data has been registered in the above customer management database, it obtains an authentication. If the recognition data is not registered, it cannot obtain the authentication. That is, when the authentication cannot be obtained based on the recognition data, the provider 6 finishes the processing since the authentication ended in failure (2).

If the authentication can be obtained, as a third step, the provider 6 assigns one of plural MAC addresses that have been previously prepared so as to be able to assign to all shipped receiving boards 7 respectively as unique terminal information, and then, encodes the MAC address being e.g. "00:11:22:33:44:01" by a prescribed coding system to generate a key ID "1234567890" as converted unique information.

Here, the MAC address is a unique address in the world, and also the key ID generated based on the above MAC address is unique data; the receiving boards 7 have their own addresses and data different from each other. Furthermore, redundant data is added to the key ID to prevent easy falsification by a user.

Then, the provider 6 returns the software for a receiving board as an update program needed to start the one-to-one data communication service with the client PC 3 via the communication satellite 9, the download application needed to download the above software for a receiving board in the receiving board 7 and the aforementioned key ID, back to the client PC 3 acting as a receiver through the Internet 5 and the terrestrial circuit 4 as installed data (3).

Here, with respect to the software for a receiving board and the download application, compressed data are transmitted to the client PC 3 without change. In this connection, the software for a receiving board and the download application are common data to all of the receiving boards 7. Therefore, for the provider 6, it is unnecessary to prepare different software for a receiving board and download application for each receiving board 7.

As a fourth step, the client PC 3 receives the installed data returned back from the provider 6 via the TA 30, and temporarily writes this in the main memory 27 via the serial port 29, CPU-PCI bridge 23 and a host bus 24.

Then, the client PC 3 reads out the download application in the installed data temporarily written in the main memory 27 under the control of the CPU 25 while performing data extension, and controls a video graphics array (VGA) controller 31 based on the above download application to give the user a notice by displaying the assigned key ID on the display of a monitor 32 and then displays an input screen corresponding to the download application. Then, in the client PC 3 the key ID is inputted in a dialog box on the input screen of the monitor 32 by the user (4).

As a fifth step, the client PC 3 divides into blocks the data of key ID entered by the user with the CPU 25, and further checks the sum of data in each block by performing a check sum step to judge whether it is a legal key ID or not.

Here, if the legality of the key ID is determined by the CPU 25, the client PC 3 reads out the software for a receiving board which is common to all of the receiving boards 7 while performing data extension from the main memory 27 and stores it in a prescribed area (shown by diagonal lines in FIG. 5) in a hard disk drive (HDD) 26. At the same time, the client PC 3 reads out the key ID from the main memory 27 and stores this in another area (shown in blank in FIG. 5) that is different from the software for a receiving board, and then transfers the software for a receiving board to the receiving board 7.

Here, the client PC 3 performs data extension on the software for a receiving board only when the key ID is legal, and until that time the data-compressed software is stored in the main memory 2 as it is, so that analysis or falsification of the software for a receiving board by the user can be prevented.

The receiving board 7 writes in the software for a receiving board transferred from the client PC 3 to a specified area (shown by diagonal lines in FIG. 5) of a flash memory 19 acting as a storage means via a PCI bus interface 21 and a data processor 20, to update the software so as to correspond to a data communication service (5).

As a sixth step, the client PC 3 returns the original MAC address by reading out the key ID from the HDD 26 and decoding it under the control of the CPU 25, and transfers this to the receiving board 7. Here, since the MAC address had been stored in the HDD 26 in a state in which it is converted into the key ID, the key ID is not recognized by the user that the key ID is MAC address. Thus, falsification by the user can be prevented.

The receiving board 7 writes in the MAC address transferred from the client PC 3 to another area of the flash memory 19 different from the prescribed area in which the software for a receiving board has been written, under the control of the CPU 18, and finishes downloading of the MAC address 6 to the receiving board 7.

Since the client PC 3 finished the download of the software for a receiving board and the MAC address to the flash memory 19 of the receiving board 7, as a seventh step, it deletes the software for a receiving board and the key ID written in the main memory 27 and the HDD 26. Thus, falsification of the software for a receiving board by the user can be prevented.

As a result, when receiving a transfer request of service information desired by the user (e.g., world wide web (www) browser or the like) from the client PC 3, the provider 6 (FIG. 3) reads out e.g., the homepage corresponding to the transfer request from a server (not shown), and adds this to a data part of an IP (Internet protocol) packet. And at the same time, the provider 6 adds the MAC address and the IP address sent along with the transfer request to the header part, generating the IP packet.

Furthermore, the provider 6 divides the IP packet into plural TS packets, and then multiplexes the TS packet to generate a transport stream, and transmits this from an antenna 6A via the communication satellite 9 as a digital broadcast signal.

The IRD 8 (FIG. 4) transmits a digital broadcast signal S10 received via the antenna 10, to the front end 13. The front end 13 performs the QPSK demodulation processing and error correction processing on the digital broadcast signal S10, and then extracts a transport stream S11, and transmits this to a demultiplexer 17 in the receiving board 7 via a high speed output port (not shown).

The demultiplexer 17 separates the transport stream S11 to convert it into plural transport stream (TS) packets, and transmits these to the data processor 20. The data processor 20 generates section data in section format by collecting plural TS packets, and transmits this to the client PC 3 via the PCI bus interface 21.

The client PC 3 outputs the section data to the monitor 32 via the PCI bus 22 and the VGA controller 31 to display the homepage desired by the user through the transfer request, on the screen of the monitor 31.

According to the above configuration, when the provider 6 obtains authentication based on the recognition data supplied from the client PC 3, the satellite Internet system 1 transmits the key ID obtained by converting the MAC address, the software for a receiving board and the download application from the above provider 6 to the client PC 3 as installed data.

The client PC 3 temporarily stores the installed data transmitted from the provider 6 in the main memory 27. When a legal key ID is entered on the input screen of the monitor 32 displayed by starting the download application, the client PC 3 performs data extension on the software for a receiving board read out from the main memory 27, writes in the extended data to a prescribed area of the HDD 26, decodes the key ID read out from the main memory 27 to return the MAC address, and writes this in to another area of the HDD 26 different from the software for a receiving board.

The client PC 3 reads out the software for a receiving board from the HDD 26, transfers the software to the receiving board 7, and writes in a flash memory 19. Then the client PC 3 reads out the MAC address from the HDD 26, transfers the MAC address to the readout receiving board 7, and writes in the flash memory 19. Thereby, the MAC address is unique to the software for a receiving board and the receiving board 7. The MAC address is necessary to start the downloading of the one-to-one data communication service into the flash memory 19 via the provider 6 and the communication satellite 9.

In this manner, in the satellite Internet system 1, downloading of software for a receiving board and MAC address is executed only when the user transmits the recognition data to the provider 6 with the client PC 3 and enters the key ID on the input screen displayed on the monitor 32 based on the installed data supplied from the above provider 6. Therefore, the user can structure a communication condition capable of using a satellite Internet service without knowledge of the download processing of the software for a receiving board and the MAC address.

Furthermore, the satellite Internet system 1 allows the HDD 26 to separately store both the software for a receiving board and the download application that are common to all the receiving boards 7, and the unique key ID different for each receiving board 7 to respective storage areas. Thereby, even if the software for a receiving board and the download application are opened to the Internet, leakage of information unique to the user can be prevented because the key ID is never included.

Since the satellite Internet system 1 converts the MAC address into the key ID and transmits this in a state adding redundant data, the security of the MAC address unique to the receiving board 7 can be further improved.

In the satellite Internet system 1, even in the case where the MAC address is assigned to the receiving board 7 and then an IC card number unique to each IRD is transmitted to the above receiving board 7 and additionally installed, the provider 6 can readily install the IC card number in the flash memory 19 using the software for a receiving board downloaded in the above receiving board 7 by transmitting the IC card number from the client PC 3 to the receiving board 7 based on the MAC address. That is, the satellite Internet system 1 can easily update only unique terminal information such as the MAC address, the IC card or the like in similar manner.

Since the satellite Internet system 1 assigns the MAC address to the receiving board 7 and then notifies the provider 6 of the content of the software written in the flash memory 19 of the above receiving board 7, the satellite Internet system 1 can get the above provider 6 to transmit a new update program to update the flash memory 19 of the receiving board 7 based on the MAC address. Thereby, update of the receiving board can be readily performed.

Furthermore, since the satellite Internet system 1 fixedly assigns the unique MAC addresses to all the receiving boards 7, the client PC 3 can transmit a transfer request of service information to the provider 6 with the MAC address added. Thus, since the provider 6 can use the transmitted MAC address as the receiver's address, management of the MAC addresses assigned to all the receiving boards 7 is unnecessary for the provider 6; reply processing of service information to the transfer request becomes easy.

According to the above configuration, when obtaining authentication based on the recognition data from the client PC 3, the satellite Internet system 1 transmits the installed data from the provider 6 to the client PC 3, and installs the MAC address in the flash memory 19 of the receiving board 7 via the above client PC 3, and simultaneously downloads the software for a receiving board to change the processing. Thereby, it can transmit the transfer request to the provider 6 along with the MAC address from the client PC 3. Furthermore, the provider 6 can use the transmitted MAC address as the address of a receiving terminal 2. Thus, a homepage corresponding to the transfer request can be transmitted from the provider 6 via the communication satellite 9 to the receiving terminal 2.

Note that, in the aforementioned embodiment, the recognition data is transmitted from the client PC 3 to the provider 6 so that the client PC 3 makes the provider 6 prepare the software for a receiving board and the key ID, and downloads them in the flash memory 19 of the receiving board 7. In addition, the provider 6 may become central equipment and transmit the software for a receiving board, the download application and the key ID to the client PC 3 along with a prescribed identifier that corresponds to the receiving board 7 via the communication satellite 9. The above client PC 3, receiving the identifier, downloads the software for a receiving board in the receiving board 7 using the download application and downloads the MAC address obtained by returning the key ID in the receiving board 7.

In the aforementioned embodiment, the service information corresponding to the transfer request such as a homepage or the like is transmitted to the client PC 3 via the communication satellite 9. The service information can also be transmitted to the client PC 3 using the Internet 5 and the terrestrial circuit 4. Also in this case, the similar effects to the aforementioned embodiment can be obtained.

In the aforementioned embodiment, section data in a section format is generated by collecting plural TS packets through the demultiplexer 17 and the data processor 20 of the receiving board 7. This data is transmitted to the client PC 3 via the PCI bus interface 21, to display the picture of the homepage on the monitor 32. The data processor 20 also can be provided in the IRD 8 to directly display the picture based on the section data obtained via the demultiplexer 14 and the data processor 20 in the IRD 8, on a television screen.

In the aforementioned embodiment, the software for the flash memory 19 in the receiving board 7 is updated based on the software for a receiving board. However, the present invention is not only limited to this but also hardware such as a programmable logic device (PLD) that can freely change the circuitry of e.g. field programmable gate arrays (FPGA) can be updated.

In the aforementioned embodiment, the MAC address is written by converting the key ID after the software for a receiving board is written in the flash memory 19 of the receiving board 7. In addition, in the case where the software for a receiving board in which the MAC address has been written is transmitted, the software for a receiving board and the MAC address can be integrally written in the flash memory 19 of the receiving board 7 after being subjected to data extension.

In the aforementioned embodiment, the key ID generated by encoding the MAC address is transmitted. Also, if there is no danger of falsification by user, it is not always necessary to convert the MAC address into the key ID. Moreover, in converting, provided that a receiving board 7 can have unique information, the MAC address can be converted into unique terminal information other than key ID and used.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

The invention claimed is:

1. A method of transmitting data from a transmission apparatus to one of a plurality of receiving terminals, comprising:
communicating between said one receiving terminal and the transmission apparatus via an Internet system, said one receiving terminal being operable to receive a digital broadcasting signal;
receiving authentication data associated with said one receiving terminal;
authenticating said authentication data;
upon authenticating, converting unique terminal information identifying said one receiving terminal as a destination of transmission into converted unique terminal information comprising a key ID, said unique terminal identification information being selected in a manner unrelated to said authentication data, and said key ID being an encoded version of said unique terminal identification information;
transmitting said key ID, an update program to change the processing of said one receiving terminal, and a download application to said one receiving terminal, said key ID being storable in a storage location of the receiving terminal so that the stored key ID is not recognizable as said encoded version of said unique terminal identification information;
executing said download application at said one receiving terminal to obtain an inputted key ID;
comparing said inputted key ID with said transmitted key ID to validate said inputted key ID;
upon validation of said inputted key ID, updating the processing of said one receiving terminal, said updating comprising:
returning said converted unique terminal information comprising said key ID to said unique terminal information by decoding said key ID,
installing said unique terminal information on a device of said one receiving terminal, and
executing said update program on said device of said one receiving terminal.

2. The method of claim 1, further comprising:
transmitting from said one receiving terminal to said transmission apparatus a transfer request based on said update program and said unique terminal information; and
supplying data responsive to said transfer request from said transmission apparatus to said one receiving terminal based on said unique terminal information.

3. The data transmitting method according to claim 2, wherein said supplying step includes supplying said data from said transmission apparatus to said one receiving terminal via a communication satellite based on said unique terminal information.

4. The data transmitting method according to claim 2, wherein said supplying step includes supplying said data using an Internet connection from said transmission apparatus to said one receiving terminal based on said unique terminal information.

5. The data transmitting method according to claim 2, wherein said supplying step includes supplying said data from said transmission apparatus to said one receiving terminal through a terrestrial circuit based on said unique terminal information.

6. The method of claim 1, wherein said update program and said download application are common to at least some of the plurality of receiving terminals while said key ID is uniquely associated with said one receiving terminal.

7. The data transmitting method according to claim 1, wherein said data supplied by said transmission apparatus is displayed on a display apparatus of said one receiving terminal based on said unique terminal information.

8. The data transmitting method according to claim 1, wherein said unique terminal information corresponds to a unique physical address assigned to said device of said one receiving terminal.

9. The data transmitting method according to claim 1, wherein said unique terminal identification information comprises a MAC address of said one receiving terminal.

10. A system for transmitting data comprising:
a plurality of receiving terminals; and
a transmission apparatus operable to receive authentication data associated with one of said plurality of receiving terminals, to authenticate said authentication data, to convert unique terminal information identifying said one receiving terminal as a destination of transmission into converted unique terminal information comprising a key ID, said key ID being an encoded version of said unique terminal identification information, and transmitting said key ID, an update program to change the processing of said one receiving terminal, and a download application to said one receiving terminal;
said one receiving terminal being operable to output said authentication data, to receive said key ID, said update program and said download application, to communicate with said transmission apparatus via an Internet system, to execute said download application to obtain an inputted key ID, to compare said inputted key ID with said key ID received from said transmission apparatus to validate said inputted key ID, and to receive a digital broadcasting signal, and said one receiving terminal including a specified storage location operable to store said key ID and said update program to update said processing, said key ID being stored in the specific storage location so that it is not recognizable as said encoded version of said unique terminal identification information;
wherein said unique terminal identification information is selected in a manner unrelated to said authentication data, and upon validation of said inputted key ID, said one receiving terminal is further operable to update said processing by converting said key ID back to said unique terminal information by decoding said key ID, storing said unique terminal information in said storage location, installing said unique terminal information on a device of said one receiving terminal, and executing said update program on said device of said one receiving terminal.

11. The system of claim 10, wherein said one receiving terminal transmits to said transmission apparatus a transfer request based on said update program and said unique terminal information and said transmission apparatus supplies data responsive to said transfer request to said one receiving terminal based on said unique terminal information.

12. The data transmitting system according to claim 11, wherein said transmission apparatus supplies said data to said one receiving terminal via a communication satellite based on said unique terminal information.

13. The data transmitting system according to claim 11, wherein said transmission apparatus supplies said data using an Internet connection to said one receiving terminal based on said unique terminal information.

14. The data transmitting system according to claim 11, wherein said transmission apparatus supplies said data to said one receiving terminal through a terrestrial circuit based on said unique terminal information.

15. The data transmitting system according to claim 10, wherein data supplied from said transmission apparatus is displayed on a display apparatus of said one receiving terminal based on said unique terminal information.

16. The data transmitting system according to claim 10, wherein said unique terminal information corresponds to a unique physical address assigned to said device of said one receiving terminal.

17. The data transmitting system according to claim 10, wherein said unique terminal identification information comprises a MAC address of said one receiving terminal.

18. A receiving system for receiving data transmitted from a transmission apparatus, comprising:
a plurality of receiving terminals, one of said plurality of receiving terminals being operable to communicate with the transmission apparatus via an Internet system, to receive a digital broadcasting signal, to output authentication data associated with said one receiving terminal, and, upon authentication of said authentication data by said transmission apparatus, to receive a key ID derived from unique terminal information identifying said one receiving terminal as a destination of transmission, said key ID being an encoded version of said unique terminal identification information, an update program for changing the processing of said one receiving terminal, and a download application, to execute said download application to obtain an inputted key ID, to compare said inputted key ID with said received key ID to validate said inputted key ID;
a storage location operable to store said key ID and said update program received by said one receiving terminal, said key ID being stored in the storage location so that it is not recognizable as said encoded version of said unique terminal identification information;
a transfer request generated based on said update program and transmitted to the transmission apparatus along with said unique terminal information; and
data responsive to said transfer request supplied by the transmission apparatus to said one receiving terminal based on said unique terminal information;
wherein said unique terminal information is selected in a manner unrelated to said authentication data; and
wherein upon validation of said inputted key ID, said one receiving terminal is further operable to change the processing by converting said received key ID to said unique terminal information by decoding said key ID, installing said unique terminal information on a device of said one receiving terminal, and executing said update program on said device of said one receiving terminal.

19. The receiving system according to claim 18, wherein said data is transmitted via a communication satellite based on said unique terminal information.

20. The receiving system according to claim 18, wherein said data is transmitted using an Internet connection based on said unique terminal information.

21. The receiving system according to claim 18, wherein said data is transmitted through a terrestrial circuit based on said unique terminal information.

22. The receiving system according to claim 18, wherein said data transmitted from the transmission apparatus is displayed on a display based on said unique terminal information.

23. The receiving terminal according to claim 18, wherein said unique terminal information is a unique physical address corresponding to said device of said receiving terminal, and is fixedly assigned to said device of said receiving terminal.

24. The receiving system according to claim 18, wherein said unique terminal information comprises a MAC address of said one receiving terminal.

25. A method of receiving data transmitted from a transmission apparatus to one of a plurality of receiving terminals, comprising:
communicating between said one receiving terminal and the transmission apparatus via an Internet system, said one receiving terminal being operable to receive a digital broadcasting signal;
receiving a key ID, an update program for changing the processing of said one receiving terminal, and a download application from said transmission apparatus, said key ID being derived from unique terminal information identifying said one receiving terminal as a destination of transmission, said unique terminal identification information being selected in a manner unrelated to authentication data associated with said one receiving terminal, and said key ID being an encoded version of said unique terminal identification information;
storing said key ID and said update program received by said one receiving terminal in a storage location, said key ID being stored in the storage location so that it is not recognizable as said encoded version of said unique terminal identification information;
executing said download application to obtain an inputted key ID;
comparing said inputted key ID with said key ID received from said transmission apparatus to validate said inputted key ID;
upon validation, converting said received key ID to said unique terminal information by decoding said received key ID, installing said unique terminal information on a device of said one receiving terminal, and executing said update program on said device of said one receiving terminal.

26. The method of claim 25, further comprising:
transmitting said unique terminal information and a transfer request based on said update program from said one receiving terminal to said transmission apparatus; and
receiving data transmitted from said transmission apparatus in response to said transfer request based on said unique terminal information.

27. The data receiving method according to claim 26, wherein said data is transmitted from said transmission apparatus via a communication satellite based on said unique terminal information.

28. The data receiving method according to claim 26, wherein said data is transmitted from said transmission apparatus using an Internet connection based on said unique terminal information.

29. The data receiving method according to claim 26, wherein said data is transmitted from said transmission apparatus through a terrestrial circuit based on said unique terminal information.

30. The data receiving method according to claim 26, wherein said data transmitted from said transmission apparatus is displayed on a display based on said unique terminal information.

31. The data receiving method according to claim 26, wherein said unique terminal information is a unique physical address corresponding to said device of said one receiving terminal.

32. The data receiving method according to claim 25, wherein said unique terminal information comprises a MAC address of said one receiving terminal.

33. A method of transmitting data between a provider device and one of a plurality of client devices remote from the provider device, comprising:

transmitting recognition data from a first one of the client devices to the provider device, the recognition data being unique to the first client device;

the provider device authenticating the recognition data;

the provider device assigning a MAC address to a receiving device coupled to the first client device, the MAC address being a unique address for use with a receiver device and being unrelated to the recognition data of the first client device;

the provider device generating a unique key ID based on the MAC address by encoding the MAC address;

transmitting a software application, a download application and the unique key ID from the provider device to the first client device, the unique key ID being storable in a storage location of the first client device so that the stored unique key ID is not recognizable as an encoded version of the MAC address;

executing the download application to identify the unique key ID on the first client device;

validating the unique key ID with the first client device; and if the unique key ID is validated:

transferring the software application to the receiver device;

retrieving the MAC address from the unique key ID by decoding the unique key ID; and transferring the MAC address to the receiver device for use as a new address of the receiver device.

34. A system, comprising:

a provider device;

a plurality of client devices remote from the provider device, a first one of the plurality of client devices having recognition data associated therewith, the recognition data being unique to the first client device; and a plurality of receiver devices, a first one of the receiver devices having an address associated therewith and being coupled to the first client device;

wherein the provider device is operable to authenticate the recognition data of the first client device, to assign a unique MAC address unrelated to the recognition data of the first client device to the first receiver device, to generate a unique key ID based on the MAC address by encoding the MAC address, and to transmit a software application, a download application and the unique key ID to the first client device, the unique key ID being storable in a storage location of the first client device so that the stored unique key ID is not recognizable as an encoded version of the MAC address, and wherein the client device is operable to execute the download application to identify the unique key ID, to validate the unique key ID, and, if the unique key ID is validated, to transfer the software application to the receiver device, to retrieve the MAC address from the unique key ID by decoding the unique key ID, and to transfer the MAC address to the receiver device for use as a new address of the receiver device.

* * * * *